United States Patent [19]

Schwartz

[11] 4,007,354
[45] Feb. 8, 1977

[54] CALCULATOR AND MEDIUM WITH COMMANDS FOR CALCULATOR OPERATION

[76] Inventor: Samuel A. Schwartz, 12743 Arroyo de Arguello, Saratoga, Calif. 95070

[22] Filed: Mar. 13, 1975

[21] Appl. No.: 557,941

[52] U.S. Cl. .................... 235/61.6 R; 235/61.12 R
[51] Int. Cl.[2] .................. G06K 15/00; G06K 21/04
[58] Field of Search ............ 235/61.11 R, 61.11 A, 235/61.11 E, 61.6 E, 61.6 R

[56] References Cited

UNITED STATES PATENTS

| | | | |
|---|---|---|---|
| 2,346,250 | 4/1944 | Bryce | 235/61.9 R |
| 3,127,504 | 3/1964 | Arnold | 235/61.9 R |
| 3,284,929 | 11/1966 | Azure, Jr. | 235/61.6 E |
| 3,476,917 | 11/1969 | Trebotich et al. | 235/61.11 A |
| 3,619,569 | 11/1971 | Hoehn | 235/61.6 E |
| 3,643,348 | 2/1972 | Azure, Jr. | 235/61.6 E |
| 3,737,628 | 6/1973 | Azure, Jr. | 235/61.6 E |

Primary Examiner—Daryl W. Cook

[57] ABSTRACT

A calculator has a mechanical drive means that responds to prerecorded instructions on a medium. The medium, such as an apertured card, is driven incrementally to consecutive stop positions. At each stop position, a program prompt is visually presented to the operator that defines the variable or numerical value to be entered by means of the keyboard. Upon entry, the card is physically moved to the next stop position that contains the next prompt and this is repeated until all variables in a particular program have been entered. In the physical space on the medium following every operator prompt is a series of coded machine instructions that perform the actual calculations on the variables entered by the operator. Following the entry of the last variable, the calculation is completed and the results are presented on the final stop position of the medium.

11 Claims, 4 Drawing Figures

CALCULATOR AND MEDIUM WITH COMMANDS FOR CALCULATOR OPERATION

BACKGROUND OF THE INVENTION

1. Field of the Invention

The invention relates to a calculator assembly, and in particular to a hand-operated electronic calculator that operates mechanically and electrically in conjunction with a prerecorded medium.

2. Description of the Prior Art

Presently known calculators require the user to operate function keys as well as numerical keys to perform a calculation in a series of steps. This mode of operation is time-consuming and subject to human error. Several reiterations and repetitions may be necessary to run through a problem without error.

Programmable calculators are employed to reduce the degree of error and speed up the work effort. However, with calculators that are programmable, an optical display and reader apparatus are generally required to interpret the program and to verify entries. The display and reader apparatus are relatively expensive in cost and maintenance. It would be desirable to have a calculator, of the portable type for example, with a minimum number of keys, that can perform a great multiplicity of data processing sequences in a simplified manner, with relatively inexpensive hardware.

SUMMARY OF THE INVENTION

An object of this invention is to provide a novel combination of a calculator assembly that operates in conjunction with a prerecorded medium.

Another object of this invention is to provide a calculator assembly that accepts interchangeable media with different prompting instructions.

Another object is to provide a calculator that displays operator prompts and results of calculations in a simplified, inexpensive manner.

Another object is to provide suitable media with coordinated operator and calculator instructions.

In accordance with an embodiment of this invention, a calculator assembly has an interface for receiving a preencoded medium, preferably a punched card. The card includes one set of apertures aligned in a column, each aperture serving to delineate a stop position. Physically aligned with each stop position, the card contains a visual presentation of the operator prompt that is framed by a viewing window in the calculator. This prompt designates to the operator the entry of a variable number that is associated with the calculation to be performed as the card is moving to the next stop position. After entry of the number and subsequent depression of an Entry key, the medium is advanced physically to the next stop position. As the card is advancing, following a stop position, a series of calculator operation instructions are read from the card by optical, magnetic, contact or other sensing means. As each instruction is read into the calculator, the operation takes place while the card is advancing. The relatively slow movement of the medium allows each operation to be completed before the next instruction is detected. These steps are repeated until the final calculation is completed, whereupon the final numerical result is presented at the last stop position of the medium. The final result is presented on the calculator display when the prompt on the medium indicates typically "FINAL RESULT" or simply "RESULT".

DESCRIPTION OF THE DRAWING

The invention will be described with reference to the drawing in which.

DETAILED DESCRIPTION OF THE PREFERRED EMBODIMENT

Figure 1:
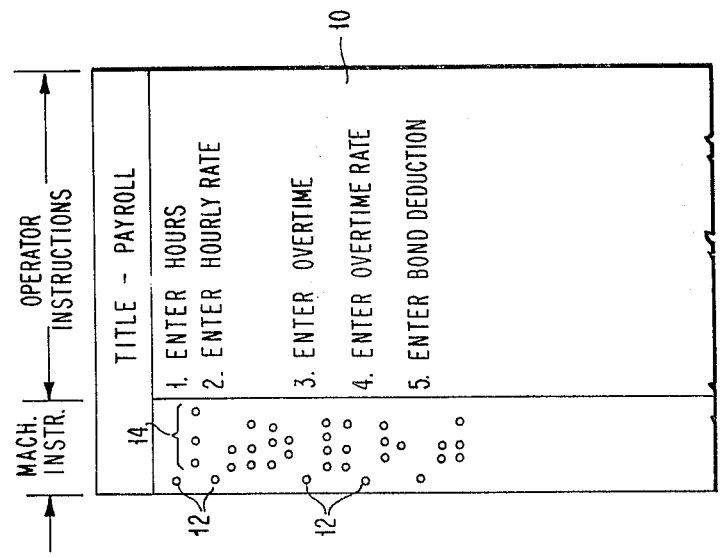
FIG. 1 is an illustration of a prerecorded medium, partly broken away, which is an apertured card in this embodiment, such as employed in accordance with this invention.

With reference to FIG. 1, an apertured card 10, such as may be used with the present invention comprises two sections, designated as Machine Instructions and Operator Instructions or PROMPTS, respectively. Under the Machine Instructions, there is one column of vertically aligned stop apertures 12 (at the left), which are located at stop positions in horizontal relation thereto. Associated with each stop position is a group of instruction apertures 14 disposed in one or more horizontal rows. The groupings 14 differ in their arrangements, and each group 14 represents a series of instructions for the calculator logic to follow.

In the section under Operator Instructions, there are visual Enter instructions that relate to the apertured groups 14 under the Machine Instructions column. For example, the visual Enter instructions may instruct the operator to enter payroll factors for employee payroll computation. These instructions may include hours worked, hourly rate, overtime hours worked, overtime hourly rate, deductions and the like.

Associated with and following each ENTER instruction is a number of horizontal lines of apertures coded in a pattern 14, which will serve to direct the logic flow of the calculator circuitry. The pattern and the number of apertures are determined by the necessary operations and constants that are to be entered into the calculator prior to the succeeding ENTER instruction. Thus, the spacings between the ENTER command statements on the card 10 are variable and depend upon the operation to be performed at each command.

Figure 2:
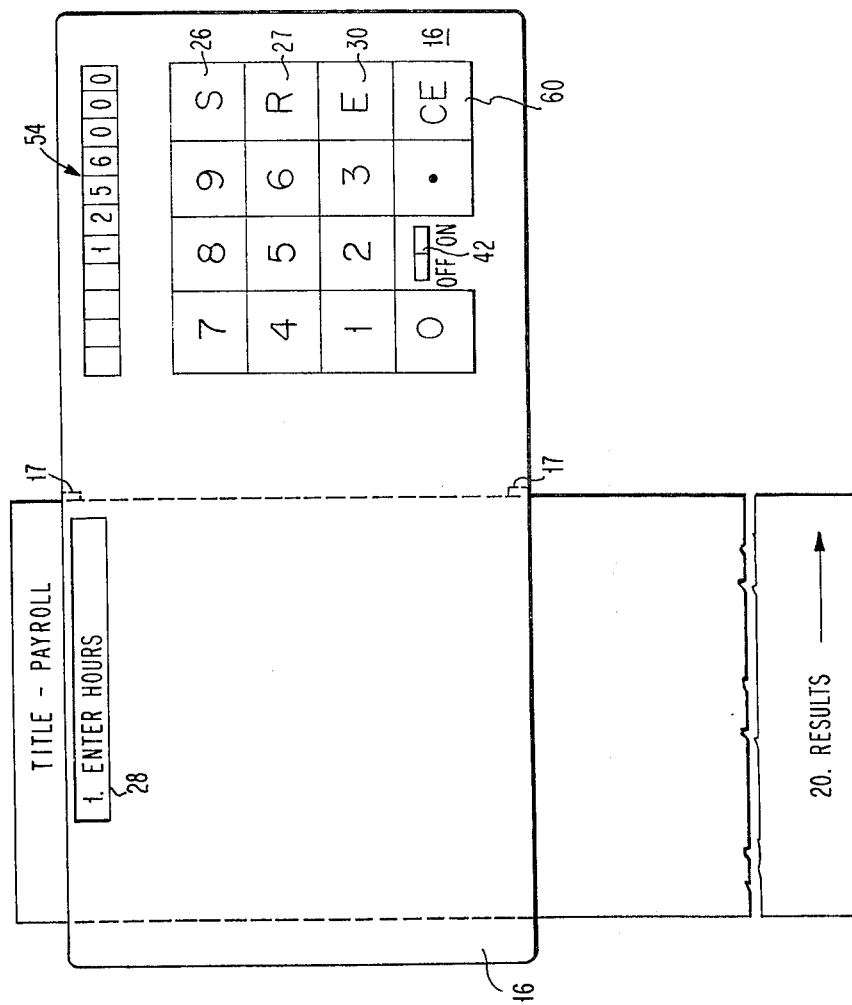
FIG. 2 is a plan view of a calculator assembly and its keyboard, and with an apertured card inserted for coaction with the calculator, as used with the invention.

As illustrated in FIG. 2, the apertured card 10 is inserted in a portable or desk type calculator 16, having a slot and guide elements along one side, until stop elements 17 are met. The calculator 16 has a keyboard including numerical keys 0-9, a Clear Entry key 60, a Start key 26, a Repeat key 27 and an Enter key 30. An ON-OFF switch 42 controls power to the machine. No operation keys are needed, as the apertured program card 10 provides the instructions to the calculator eliminating the need for the operator to perform the intermediate steps of manually entering operations.

Figure 3:
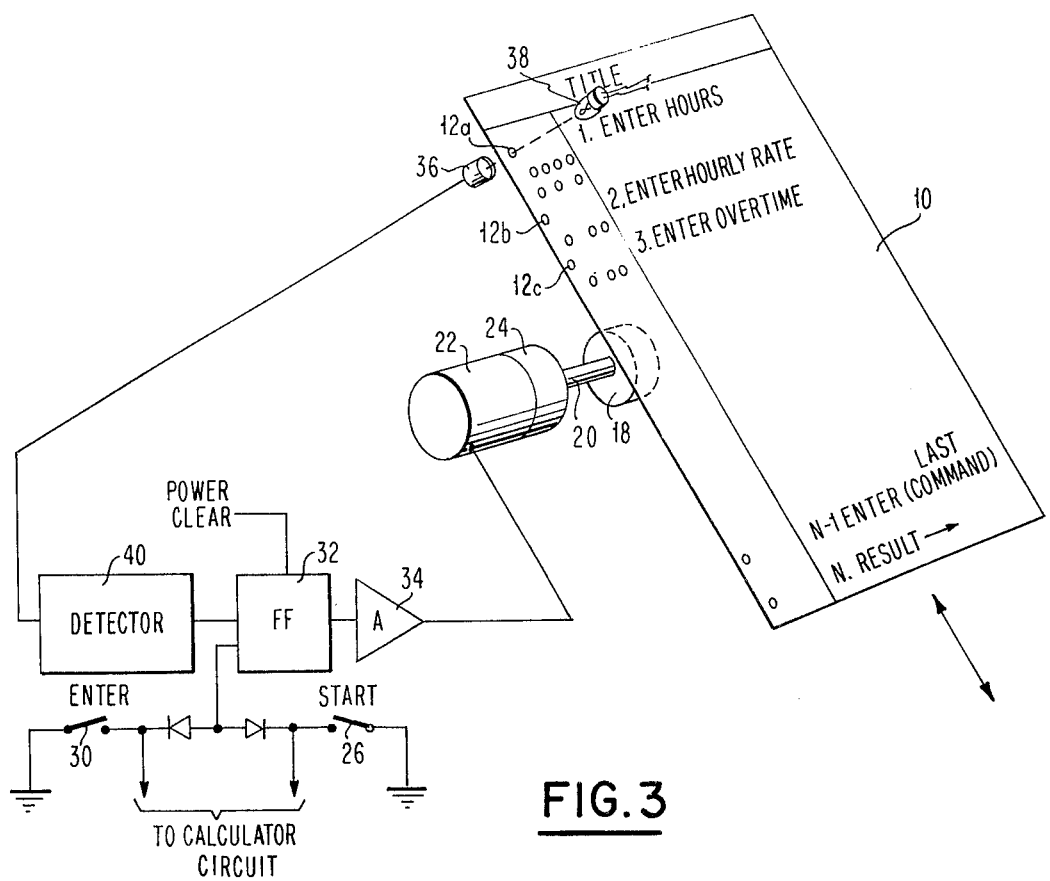
FIG. 3 is a schematic view of the means for advancing the card from one stop position to the next.

When inserted in the calculator 16, the card 10 engages a drive wheel 18 that is mounted to the shaft 20 of an indexing motor 22, as depicted in FIG. 3. A reduction gear train 24 is coupled to the motor 22 to enable slow stepping speeds.

With the card 10 positioned in the calculator slot, the START (S) key 26 is depressed, which causes the drive mechanism, including the drive wheel 18 to advance the card to the first stop position 12a adjacent to the first ENTER command. The START key 26 also clears all the registers in the calculator circuitry. The calculator has a slotted window 28, which displays the command listed on the card that the operator is to follow, e.g. ENTER HOURS. The operator then depresses one or more numerical keys, and then the ENTER key 30. The ENTER key 30 actuates the indexing motor 22, in the same manner as initiated by the START key 26, as illustrated in FIG. 3.

Actuation of either calculator key 26 or 30 sets flip flop (FF) 32, generating a true or high logic signal at the FF output. The FF output signal is fed to the drive amplifier 34, thereby energizing the motor 22. The motor and the attached friction drive wheel 18 drive the card 10, which is held between the wheel and the calculator housing guide elements, upwards in the calculator from one stop position to the next. In order to effectuate the stop at the succeeding stop aperture 12, a photoelectric sensing assembly 36 is energized by radiation from a fixed light source 38 that passes through the stop aperture. A voltage signal from the activated sensor 36 is detected by a transition detector 40, which resets the flip-flop 32, thereby cutting off drive power to the motor 22.

The transition detector 40 may be a conventional Schmitt trigger circuit that is followed by a differentiator which may constitute a simple resistor-capacitor RC circuit. The Schmitt trigger acts to provide fast transitions generated from the relatively slower electrical transitions developed in response to the movement of the card between stop positions. The output of the Schmitt trigger is a square wave having a voltage rise transition that corresponds to a no light-to-light condition sensed by the photoelectric assembly 36; while a voltage fall corresponds to a light-to-no light condition. By differentiation of the proper transition, a stop signal is obtained to reset the FF 32 and remove drive power for the motor 22.

Initially, when the calculator is turned on by means of the OFF-ON switch 42, all the calculator registers are cleared, and a readout display 54 is blank or reads all zero. However, it is not desirable to begin running the motor 22 until a card 10 is positioned in place. Thus upon turn-on of the switch 42, a RESET signal indicated as Power Clear is introduced to the FF 32, so that the indexing motor 22 is held in an OFF condition. When the START key 26 is depressed after insertion of a card, a set signal is directed to the FF 32 which enables the motor 22 to start to run.

The operator then proceeds to follow the series of instructions that are visually presented in the window 28 of the calculator 16, and which appear on the card 10 at each stop position preceding the instruction group of apertures 14. The operator needs only to enter a numerical value, by depressing one or more keys, and then depress the ENTER key 30 for each numerical entry.

Following each position of an ENTER instruction listed on the card under Operator Instructions, there is a predetermined sequence of coded aperture groups that represent both numeric and operational entries into the calculator circuitry. The most significant bit in each coded group 14 defines whether the bits within the particular group are to be interpreted as either numbers (constants) or operations.

Figure 4:
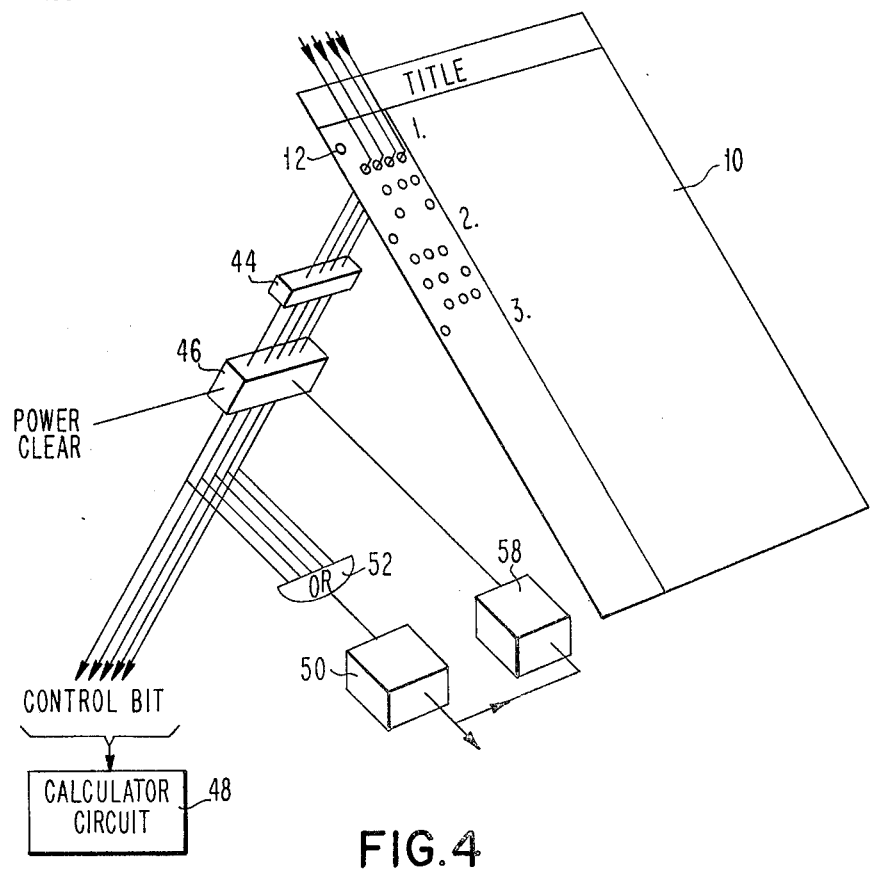
FIG. 4 is a schematic view of the instruction sensing means and timing circuitry for operating the calculator logic circuitry.

The coded apertures 14 at any stop passes light received from a source, which may be a shaped light beam, in the pattern of the apertures to an array or bank 44 of photoelectric cells, which arrangement is known in the art. The photocell array 44 provides a multi-bit parallel signal in digital code, which is stored in an $n$-bit storage register 46, as shown in FIG. 4.

The coded output of the storage register 46, which includes one or more control bits, and data bits, is directed to the calculator circuitry 48, through an OR gate 52 to a strobe circuit 50. The strobe circuit 50 generates timing pulses that strobe the control and data bits into the calculator circuit 48. In addition, the strobe pulses are passed through a suitable time delay 58, and to the storage register 46 to clear the register prior to entry of the next data word that is read from the apertured card. The register 46 is also initialized and cleared in response to a Power Clear Signal that is developed when power is turned on by switch 42. The time delay 58 provides sufficient time for strobing the data into the calculator circuitry 48, before the data is removed by clearing the register 46.

When all the entries under Operator Instructions contained on the inserted card 10 have been made, the Result or Answer is obtained following the last entry designated on the card. The Result or Answer is shown in the visual display 54 that is part of the calculator.

If a computation for a particular card is to be repeated for a different set of numbers, the card does not have to be removed and then reinserted in the calculator. Actuation of the Repeat key 27 moves the card backwards in the calculator until the first entry position is encountered and the card stops and is ready for a subsequent repeat procedure.

It should be understood that various modifications of the embodiment disclosed herein may be made within the scope of this invention. For example, in lieu of the drive wheel 18, the card may include sprocket holes that are engaged by a sprocket wheel for stepping the card from one position to the next. Also, instead of stop apertures, electrically conductive elements may be sensed to generate electrical signals for stopping the card at each position. Furthermore, the coded cards may use various forms of registering the stop indicators and different permutations of commands. The cards may be rectangular, circular, in belt form, or any configuration which is accommodated by the calculator. In any event, the cards are readily interchangeable, and the calculator may be operated with any similar card, requiring only the numerical keys, Clear Entry Key, Start and Repeat keys, and Enter key. In this way, the operator needs only to read a simple instruction, and depress only numerical keys and an ENTER key in response, without necessitating keeping track of calculation procedure, constants, intermediate results, percentages, and other usually required operations.

In certain physical implementations of this invention, a round card or endless belt may be more desirable than the flat rectangular card. This would more easily allow loop procedures that require repeated operations until a desired result is obtained. These configurations would also enhance procedures that require conditional branching thereby allowing more complex procedures to be performed.

Furthermore, the configuration of apertures in sections of stop elements and operator instructions may be modified so that they are arranged in a single column, for example, thereby allowing a narrower width of the medium.

What is claimed is:

1. An electronic calculator apparatus having arithmetic calculating circuitry and storage registers, for cooperating with a medium including means for indicating stop positions at which said calculator is to receive input data and having coded instructions following each stop position comprising:
   a set of alphanumerical entry keys;
   an entry key;
   means for accepting said record medium, including guide means;
   drive means for engaging said medium and for stepping said medium from one stop position to the next; and
   sensing means for sensing the coded instructions following each stop position of said medium, so that the circuitry of said calculator will operate in response to said coded instructions employing the numbers entered by said numerical entry keys at such stop position.

2. An electronic calculator apparatus as in claim 1, including a Start key for activating said drive means to advance said medium to the first stop position, and for clearing the registers of the calculator circuitry.

3. An electronic calculator apparatus as in claim 1, including a Repeat Key for activating said drive means to return said medium to the first position for a repeat calculation procedure.

4. An electronic calculator apparatus as in claim 1, wherein said drive means is activated in response to depression of said entry key.

5. An electronic calculator apparatus as in claim 1, further comprising a flip-flop circuit for controlling the starting and stopping of said drive means, so that said record medium is advanced from one stop position to the next.

6. An electronic calculator apparatus as in claim 1, including a window for displaying to the operator a visual instruction corresponding to the coded instruction at the stop position.

7. An electronic calculator apparatus as in claim 1, including a photoelectric magnetic, or contact sensing means for sensing the coded instructions consisting of a permutation of apertures or magnetic spots on the record medium.

8. An electronic calculator as in claim 7, including a storage register for storing the data sensed by said sensing means.

9. An electronic calculator as in claim 8, including a timing and delay means for clearing said storage register and for strobing the data into said storage register.

10. An assembly for performing calculations by an operator in response to visually presented instructions comprising:
    a record medium having indicia registered thereon for establishing stop positions, and signal generating elements associated with each stop position,
    said record medium further including operator readable instructions registered on said medium associated with each stop position and related functionally to said signal generating elements;
    an electronic calculator comprising means for engaging said medium and for driving said medium from one stop position to another;
    keyboard means having numerical entry keys for entering arithmetic data by an operator in response to said registered readable instructions; and
    means for sensing said signal generating elements and for performing an operation on the arithmetic data entered by said operator.

11. An assembly as in claim 10, wherein said keyboard means includes alphabetic entry keys for entering alphabetic data in addition to arithmetic data.

* * * * *